US010270881B2

United States Patent
George et al.

(10) Patent No.: US 10,270,881 B2
(45) Date of Patent: Apr. 23, 2019

(54) REAL-WORLD USER PROFILES VIA THE INTERNET OF THINGS

(71) Applicant: Adobe Inc., San Jose, CA (US)

(72) Inventors: William Brandon George, Pleasant Grove, UT (US); Kevin Gary Smith, Lehi, UT (US)

(73) Assignee: ADOBE INC., San Jose, CA (US)

(*) Notice: Subject to any disclaimer, the term of this patent is extended or adjusted under 35 U.S.C. 154(b) by 377 days.

(21) Appl. No.: 14/946,355

(22) Filed: Nov. 19, 2015

(65) Prior Publication Data

US 2017/0149928 A1  May 25, 2017

(51) Int. Cl.
| G06F 15/173 | (2006.01) |
| H04L 29/08 | (2006.01) |
| G06F 17/30 | (2006.01) |
| G06Q 30/02 | (2012.01) |

(52) U.S. Cl.
CPC ...... *H04L 67/306* (2013.01); *G06F 17/30864* (2013.01); *G06Q 30/0201* (2013.01); *H04L 67/12* (2013.01); *H04L 67/22* (2013.01)

(58) Field of Classification Search
CPC . G06F 17/30477; H04L 67/12; H04L 67/306; H04L 67/303; A61B 2562/08; A61B 5/1118; A61B 5/6898
See application file for complete search history.

(56) References Cited

U.S. PATENT DOCUMENTS

| 6,601,016 | B1 * | 7/2003 | Brown | A63B 24/0062 |
| | | | | 702/182 |
| 9,314,665 | B2 * | 4/2016 | Weast | G06F 19/3481 |
| 9,413,827 | B2 * | 8/2016 | Sharma | H04L 67/12 |
| 9,449,323 | B2 * | 9/2016 | Mikan | G06Q 30/01 |
| 9,662,015 | B2 * | 5/2017 | Proud | A61B 5/0024 |
| 9,682,281 | B2 * | 6/2017 | Mestas | A63B 24/0062 |
| 9,720,443 | B2 * | 8/2017 | Malhotra | G06F 1/163 |
| 9,723,898 | B2 * | 8/2017 | Proud | A44C 5/0015 |
| 2008/0086318 | A1 * | 4/2008 | Gilley | G06Q 10/06 |
| | | | | 705/319 |
| 2008/0162555 | A1 * | 7/2008 | Schuler | G06Q 10/109 |
| 2009/0063099 | A1 * | 3/2009 | Counts | G01C 21/20 |
| | | | | 702/188 |
| 2012/0116684 | A1 * | 5/2012 | Ingrassia, Jr. | G06F 19/321 |
| | | | | 702/19 |

(Continued)

*Primary Examiner* — Shean Tokuta
(74) *Attorney, Agent, or Firm* — Finch & Maloney PLLC (57) ABSTRACT

Techniques are disclosed for generating enhanced user profiles that include "off-line" activities omitted from conventional user profiles. In one embodiment, each of two or more Internet of Things (IoT) products records usage data descriptive of a user's interactions with the IoT product. This usage data is based on values of physical parameters measured by sensors embedded within the IoT products. In recording the usage data, an IoT product may transmit the usage and sensor data to a user profile storage device. In response to receiving the usage and sensor data from the IoT products, the user profile storage device stores the usage and sensor data and associates the usage and sensor data with the user. Additionally, the user profile storage device exposes an interface through which marketing personnel can analyze user profiles made up of the stored usage and sensor data.

16 Claims, 4 Drawing Sheets

(56) References Cited

U.S. PATENT DOCUMENTS

| | | | |
|---|---|---|---|
| 2013/0194066 A1* | 8/2013 | Rahman | G05B 1/01 340/5.51 |
| 2014/0128105 A1* | 5/2014 | Su | H04W 4/021 455/456.3 |
| 2014/0164519 A1* | 6/2014 | Shah | H04L 67/306 709/204 |
| 2014/0167973 A1* | 6/2014 | Letchner | A61B 5/1118 340/870.02 |
| 2014/0244834 A1* | 8/2014 | Guedalia | H04L 67/16 709/224 |
| 2014/0247135 A1* | 9/2014 | Proud | G06F 19/00 340/870.01 |
| 2014/0247142 A1* | 9/2014 | Proud | A61B 5/0022 340/870.02 |
| 2014/0247143 A1* | 9/2014 | Proud | A61B 5/0022 340/870.02 |
| 2014/0247151 A1* | 9/2014 | Proud | A61B 5/0024 340/870.02 |
| 2014/0249760 A1* | 9/2014 | Proud | A61B 5/443 702/19 |
| 2014/0249853 A1* | 9/2014 | Proud | G06Q 50/24 705/3 |
| 2014/0266731 A1* | 9/2014 | Malhotra | G06F 1/163 340/573.1 |
| 2014/0330408 A1* | 11/2014 | Rolley | G06F 19/3481 700/91 |
| 2015/0019342 A1* | 1/2015 | Gupta | G06Q 10/20 705/14.66 |
| 2015/0019714 A1* | 1/2015 | Shaashua | H04W 4/70 709/224 |
| 2015/0066172 A1* | 3/2015 | Yi | G06F 19/3481 700/91 |
| 2015/0113592 A1* | 4/2015 | Curtis | H04L 63/0823 726/2 |
| 2015/0113599 A1* | 4/2015 | Curtis | H04L 63/0428 726/4 |
| 2015/0113627 A1* | 4/2015 | Curtis | H04L 63/06 726/10 |
| 2015/0190072 A1* | 7/2015 | Armstrong | G06F 19/3481 600/301 |
| 2015/0217163 A1* | 8/2015 | Amis | A61B 5/0022 700/91 |
| 2015/0256423 A1* | 9/2015 | Stearns | H04L 43/045 709/224 |
| 2015/0260849 A1* | 9/2015 | Eastman | G01S 19/19 701/482 |
| 2015/0310444 A1* | 10/2015 | Chen | G06Q 20/4016 705/44 |
| 2016/0034543 A1* | 2/2016 | Nagar | G06Q 30/0627 707/748 |
| 2016/0064955 A1* | 3/2016 | Zuerner | H02J 7/007 705/39 |
| 2016/0072808 A1* | 3/2016 | David | H04L 9/3268 713/158 |
| 2016/0105292 A1* | 4/2016 | Choi | H04L 51/02 709/206 |
| 2016/0143718 A1* | 5/2016 | Serval | A46B 15/0022 15/22.1 |
| 2016/0179962 A1* | 6/2016 | Patten | G06F 17/3053 707/706 |
| 2016/0180222 A1* | 6/2016 | Sierhuis | G06F 7/023 706/47 |
| 2016/0212099 A1* | 7/2016 | Zou | H04L 63/0263 |
| 2016/0220198 A1* | 8/2016 | Proud | A61B 5/4809 |
| 2016/0249832 A1* | 9/2016 | Carter | A61B 5/0022 600/595 |
| 2016/0277528 A1* | 9/2016 | Guilaume | H04L 67/306 |
| 2016/0285979 A1* | 9/2016 | Wang | H04L 67/16 |
| 2016/0330601 A1* | 11/2016 | Srivastava | G06Q 50/265 |
| 2016/0358155 A1* | 12/2016 | Proud | G06K 19/07762 |
| 2016/0380809 A1* | 12/2016 | Hou | H04L 67/12 370/254 |
| 2017/0000348 A1* | 1/2017 | Karsten | G06F 19/3418 |
| 2017/0006030 A1* | 1/2017 | Krishnamoorthy | H04L 63/0884 |
| 2017/0019873 A1* | 1/2017 | Britt | H04L 9/0656 |
| 2017/0049335 A1* | 2/2017 | Duddy | A61B 5/0205 |
| 2017/0063927 A1* | 3/2017 | Schultz | H04L 63/20 |
| 2017/0091277 A1* | 3/2017 | Zoch | G06F 17/30554 |
| 2017/0093982 A1* | 3/2017 | Shaashua | H04W 4/70 |
| 2017/0186309 A1* | 6/2017 | Sager | H04Q 9/00 |

\* cited by examiner

REAL-WORLD USER PROFILES VIA THE INTERNET OF THINGS

FIELD OF THE DISCLOSURE

This disclosure relates to techniques of monitoring human activity, and more particularly, to techniques of tracking usage of products.

BACKGROUND

As a user explores the Internet to consume information and make purchases, the user effectively leaves behind a trail of information that can be harvested and used by marketers to create a user profile. A typical user profile consisting of interactions between a given user and that user's computer system enables marketers to analyze user behavior and interests to increase the effectiveness of their marketing activities. For example, via these user profiles, a marketer can determine products purchased by a user, products viewed by a user, a user's sentiment regarding products they have purchased, and whether the user's purchase patterns center on particular brands, types of products, and product price range. By analyzing the user's past online behavior, the marketer can more effectively target users with new products and services that are likely to be of interest to the user and remarket content previously viewed by the user that is likely now to be relevant to the user. However, conventional user profiles are limited in terms of the user activity they cover. For example, most, if not all, "off-line" user activity falls outside the purview of conventional user profiles because such user activity does not involve an interaction with a computer system. Mobile computing devices, such as smart phones, may provide some insight into a user's location while the user conducts certain on-line activities, but even this information is limited to interactions between the user and the mobile computing device. Thus conventional user profiles omit substantial, and potentially valuable, portions of a user activity.

DETAILED DESCRIPTION

Techniques are disclosed for generating enhanced user profiles that include "off-line" activities omitted from conventional user profiles. In one embodiment, each of two or more Internet of Things (IoT) products records usage data descriptive of a user's interactions with the IoT product. This usage data is based on values of physical parameters measured by sensors embedded within the IoT products. In recording the usage data, an IoT product may store both the usage data and the sensor data upon which it is based in a local data store and/or may transmit the usage data and the sensor data to a remote device. Examples of the remote devices to which the IoT product transmits data include a user profile storage device. In response to receiving the usage data and the sensor data from the IoT products, the user profile storage device stores the usage data and the sensor data and associates the usage data and the sensor data with the user. Further, the user profile storage device exposes an interface through which marketing personnel can construct user profiles made up of the stored usage and sensor data, thereby gaining additional insight into the user's real-world activities with and through the IoT products.

General Overview

As previously explained, conventional user profiles provide a number of benefits, including rich detail regarding a user's online activities and interactions. However, conventional user profiles also suffer from disadvantages, for example when attempting to account for user activity that does not involve use of a conventional computing device. Mobile computing devices may supply location information for conventional user profiles, but such information lacks granularity (i.e., the location information is coarse and relatively non-specific) and also lacks further details regarding how a user interacts with the real-world. This lack of further details effectively limits how much a marketer can exploit a given user profile. For example, using conventional user profiles, a marketer can estimate the salary of a purchaser of a golf club based on the brand of the club acquired by the purchaser in an online transaction. Further, the marketer can identify which golf courses the purchaser normally plays by tracking the purchaser's mobile phone location, assuming the physical distance between the various played golf courses is sufficient so as to allow for disambiguation of distinct courses. However, when relying on conventional user profiles, a marketer cannot determine details such as the strength of the purchaser's grip, the speed at which the purchaser swings the club, the impact force with which the purchaser's club addresses the ball, whether or not the purchaser throws the club, or whether or not the purchaser is consistently in the sand or the rough. If known, these details would provide the marketer with added insight as to which products and/or services to offer the purchaser.

Thus, and in accordance with an example embodiment of the present disclosure, a system is disclosed for creating enhanced user profiles that include usage data descriptive of a user's interaction with the real world through physical objects. The system can be implemented by a plurality of IoT products connected to a user profile storage device via a communication network. In general, an IoT product can be any physical consumer product or other object that has been modified or otherwise configured with IoT capabilities including data acquisition and transmission. For instance, each IoT product includes at least one sensor configured to measure physical parameters that indicate the usage or environment of the IoT product. Each IoT product is programmed or otherwise configured to generate usage data based on values of physical parameters measured by the sensors housed in the IoT product. Further, each IoT product is programmed or otherwise configured to transmit sensor and/or usage data to one or more discrete, external devices for further processing. The sensor and/or usage data may be raw data (unprocessed sensor output signal data), but in other embodiments may be processed to some degree if so desired (e.g., compressed and formatted for purposes of efficient transmission). These external devices may include an IoT product interface device and a user profile storage device. The user profile storage device is programmed or otherwise configured to implement a sensor interface that receives the sensor and/or usage data and stores the sensor and/or usage data in a data store (e.g., a relational database). The user profile storage device is also programmed or otherwise configured to implement an association interface that receives association data and stores the association data in the data store. The association data may relate users to products and/or products to sensors. In this way, the user profile storage device may associate usage data with users to form user profiles in accordance with at least one embodiment.

The IoT product interface device may be a smart phone, laptop, desktop computer, or other computing device that can be programmed or otherwise configured to manage an IoT product. As such, the IoT product interface device includes an IoT product management module (or "app") that communicates with the IoT product to perform a variety of functions. In response to receiving sensor and/or usage data from an IoT product, the IoT product interface device stores the received data and transmits the received data to another discrete, external device (i.e., a user profile storage device in one example configuration) so that data is available for further processing.

The user profile storage device may be, for example, a physical or virtual server accessible via the communication network. The user profile storage device is programmed or otherwise configured to receive and process sensor data, usage data, and association information to generate enhanced user profiles. The sensor data and the usage data are described above. The association information includes information descriptive of associations between users of IoT products and the IoT product they use. The association information also includes information descriptive of associations between IoT products and the sensors housed in the IoT products. The user profile storage device is programmed or otherwise configured to receive and process association information from a variety of sources. These sources may include the IoT products themselves, IoT product interface devices, and/or data collection services (e.g., the ORACLE ELOQUA service, or other comparable data collection services). During processing, the user profile data storage device parses and stores the association information locally within the user profile storage device.

The user profile storage device is also configured or otherwise programmed to receive and process queries from a marketer interface device. In processing such queries, the user profile storage device executes the received queries to produce search results. Any suitable search methodology may be used. Depending on the predicate of the query, the user profile storage device may have to access sensor data, usage data, association data, or a combination thereof. For instance, to resolve usage data to a particular user, the user profile storage device may have to access usage data, sensor data associated with the usage data, IoT product data associated with the sensor data, and user data associated with the IoT product data. After generating search results that satisfy a query, the user profile storage device transmits information descriptive of the search results to the marketer interface device that originated the query.

The market interface device can be programmed or otherwise configured to process queries and query results. As such, in execution the market interface device may implement a user interface having elements configured to exchange input and output with a user (e.g. a marketer). These elements receive queries and present search results satisfying the queries, if such results exist. Note that the search results may include data from multiple IoT products, which in turn can be associated with the same user/consumer and presented by the market interface device to the marketer accordingly. The marketer can then refine and evolve the given user profile of a corresponding consumer based on the real world physical data received from the various IoT products with which the consumer has interacted. The user profile may further include or otherwise reflect data harvested from the consumer's online activities, so as to provide a more robust, enhanced user profile that reflects both real world and online activities of that consumer. With such a user profile in hand, the marketer can then better market to the consumer.

To aid the reader's understanding of various example embodiments disclosed herein, some terminology used to describe these embodiments will now be presented. As used to herein, usage data refers to, in addition to its ordinary meaning, a data descriptive of manipulation of a product, such as an Internet of Things (IoT) product. As used herein, an IoT product refers to, in addition to its ordinary meaning, a physical consumer product or other object that has been modified or otherwise configured with IoT capabilities including data acquisition and transmission. As referred to herein, a physical parameter refers to, in addition to its ordinary meaning, a characteristic of the physical world or objects residing therein. As referred to herein, an environmental parameter refers to, in addition to its ordinary meaning, a characteristic of the environment in which an IoT product resides. As referred to herein, a user registration component refers to, in addition to its ordinary meaning, an executable component configured to transmit information regarding a user of a product to a device associated with another party.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

System Architecture

Figure 1:
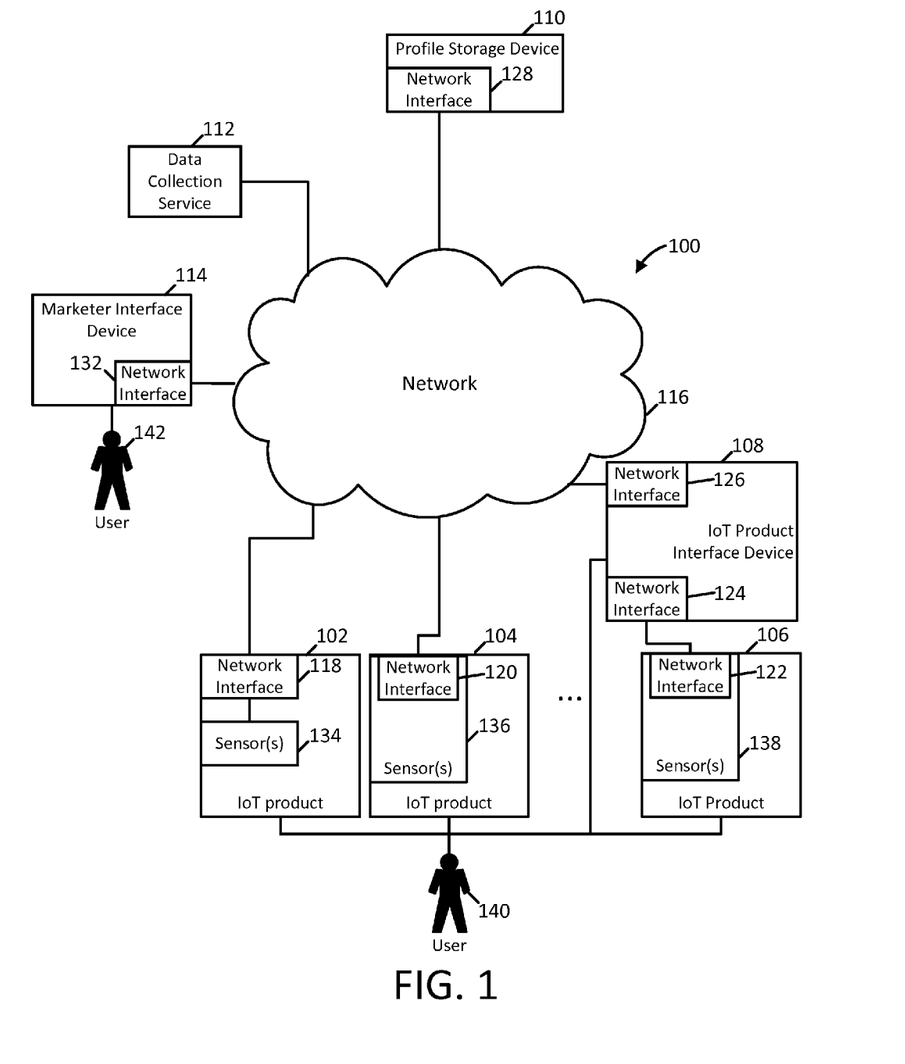
FIG. 1 is a block diagram illustrating an example user profile generation system configured in accordance with one or more embodiments of the present disclosure.

Various embodiments disclosed herein implement a user profile storage system using one or more programmable devices. FIG. 1 illustrates one example in accord with some of these embodiments, a profile storage system 100. As shown in FIG. 1, the profile storage system 100 includes IoT products 102, 104, and 106, an IoT product interface device 108, profile storage device 110, marketer interface device 114, and a communication network 116. The IoT products 102, 104, and 106 respectively include sensors 134, 136, and 138. The IoT product 102 also includes a network interface 118. The sensors 120 and 122 respectively include network interfaces 120 and 122. The IoT product interface device 108 includes a sensor management component 144 and network interfaces 124 and 126. The profile storage device 110 includes the network interface 128. The marketer interface device 114 includes a network interface 132. Illustrated users of the profile storage system 100 include users 140 and 142.

In some embodiments, the network 116 is configured to communicate (e.g., transmit and/or receive) information with connected sensors, IoT products, and programmable devices, such as the sensors 134, 136, and 138, the IoT products 102, 104, and 106, the sensor interface device 108, the profile storage device 110, the data collection service 112, and the marketer interface device 114. Broadly stated, the network 116 may include any communication network through which these devices may exchange information. For example, the network 116 may be a public network, such as the Internet, that is implemented with various IP-based network forwarding devices. The network 116 may also be or include other public or private networks such as LANs, WANs, cellular networks, extranets and intranets. The communications processed by the network 116 may be synchronous or asynchronous and bidirectional or unidirectional.

Each of the IoT products 102, 104, and 106 may be any tangible object that can be manipulated, worn, or otherwise used by a person (e.g., the user 140) that includes at least one sensor configured to identify and record physical parameters descriptive of each usage of the object. IoT products may be categorized based on a variety of commonalities. For instance, IoT products may be categorized as "electronic" or "non-electronic" products. Electronic IoT products include tangible objects that conventionally include electronic components. Non-electronic IoT products include tangible objects that conventionally do not include electronic components. IoT products may also be categorized based on product function. In another example, IoT products may be categorized by use.

The large number of IoT product categories and IoT products prohibit articulation of an exhaustive list, but to further illustrate these categories some examples follow. Examples of electronic IoT products that include cameras, smart phones, personal digital assistants, desk top computers, lap top computers, tablets, electronic glasses, electronic watches, automobiles, and the like. Examples of non-electronic IoT products include traditional tools (e.g., hammers, saws, and wrenches), dining utensils, sports equipment, art work, cookware, furniture and the like. Examples of IoT functional categories and some IoT products that are members of the categories include wearable products (e.g., clothing, shoes, sunglasses, sweatbands, other personal accessories, etc.), transportation products (e.g., bicycles, skateboards, etc.), sports equipment (e.g., snowboards, golf clubs, baseball bats, basketballs, football helmets, soccer balls, etc.), home-use products (appliances, furniture, etc.). In some instances, an IoT functional category may be as specific as a particular type of object (e.g., a snowboard) and have members that are particular makes/models of the object.

In some embodiments illustrated by FIG. 1, each of the sensors 134, 136, and 138 is configured to acquire signals descriptive of one or more physical parameters. According to some embodiments, these signals may be used to detect and identify each instance of an IoT product's use. Examples of the physical parameters that any of the sensors 134, 136, and 138 may detect and measure include acceleration, velocity, location, force, temperature, moisture, humidity, ambient light or other radiation, time, audio, manipulation of parts of an IoT product in which the sensor is housed, and the like.

In some embodiments, each of the sensors 134, 136, and 138 is configured to record the acquired signals for subsequent processing. For instance, in one embodiments, this recordation involves storing the signals in a data storage medium within the IoT product. In other embodiments, the recordation involves transmitting the signals to an external device for storage. For example, an IoT product (or a sensor itself) may include memory or some other form of data storage in which the signals may be stored. Alternatively, or additionally, an IoT product may include a network interface port and/or transmitter through which the sensor transmits the signals for remote storage.

The configuration of the sensors 134, 136, and 138 within the IoT products 102, 104, and 106 and the characteristics of communications supported by the sensors 134, 136, and 138 vary between embodiments. For instance, depending on the size and power consumption requirements of the IoT products 102, 104, and 106, the communications implemented by the sensors 134, 136, and 138 and the network interfaces 118, 120, and 122 may be synchronous or asynchronous and may be bidirectional or unidirectional (e.g., from the sensor to the network 116). Unidirectional communications from the sensors 134, 136, and 138 to the network 116 enable simpler protocols and lower power consumption. Further in some embodiments, as illustrated in FIG. 1, the network interface 118 is distinct from the sensor(s) 134 within the IoT product 102. This design may be advantageous for IoT products that contain multiple sensors, for example to decrease manufacturing costs, physical size, and power consumption. In some embodiments illustrated by FIG. 1, the network interfaces 120 and 122 are respectively included in the sensors 136 and 138. This design may be advantageous for IoT products that include a single sensor, for example to decrease manufacturing costs and physical size of such IoT products. Also as shown in FIG. 1, the sensor 138 communicates with the network 116 via the network interface 122 and the network interfaces 124 and 126 of the IoT product interface device 108. This configuration may be advantageous to support IoT products with low power availability because it enables communications involving the network interface 122 to be powered by the IoT product interface device 108. For example, the network interface 122 may be a universal serial bus interface configured to receive power from an external device, such as the sensor interface device 124.

In some embodiments, at least one of the IoT products 102, 104, and 106 is configured to generate usage data descriptive of usage instances of the IoT product. When executing according to this configuration, the IoT product identifies uses of the IoT product that are indicated within the sensor data and generates usage data based on the identified instances. In various embodiments, the processes executed to identify these instances of IoT product usage include comparing measurement values in the sensor data to predefined thresholds and ranges and other more complex artificial intelligence techniques. After successfully identifying one or more usage instances and generating usage data descriptive of these usage instances, the IoT product records the generated usage data for subsequent processing. As with the sensor data, recordation of usage data may include storing the usage data locally within the IoT product and/or transmitting (e.g., via a network interface) the usage data for storage by another device (e.g., the profile storage device 110 and/or the IoT product interface device 108). A more detailed illustration of an IoT product, including sensors and data storage, is described below with reference to FIG. 2.

Turning to the remainder of the components illustrated in FIG. 1, each of the IoT product interface device 108, the profile storage device 110, the data collection service 112, the marketer interface device 114 and at least some portions of the communication network 116 are or include one or more programmable devices. These programmable devices may be, for example, any of a variety of standardized and/or special purpose devices, such as routers, personal computers, workstations, servers, smartphones, and personal digital assistants.

In various embodiments, the IoT product interface device 108 is configured to provide an interface between with the IoT product 106 and external entities such as the profile storage device 110, the network 116, and the user 140. As such, in some embodiments, the IoT product interface device 108 implements system interfaces that receive sensor data from the IoT product 106 via the network interface 122 and transmit the sensor data to the profile storage device 110 via the network interface 126 and the network 116. In other embodiments, the IoT product interface device 108 implements one or more user interfaces that enable the user 140 to configure the IoT product, review sensor data acquired by the sensor 138, and register the IoT product. As described above, in some embodiments, the network interface 124 may provide power to the IoT product 106 to support various IoT product 106 operations (e.g., transmission of sensor date via the network interface 122, charge a battery included in the IoT product 106, etc.). Additional description of the IoT product interface device 108 is provided below with reference to FIG. 2.

In some embodiments illustrated by FIG. 1, the profile storage device 110 is configured receive sensor data and/or usage data, optionally identify uses of IoT products recorded in the sensor data (e.g., where no usage data was received), store sensor and usage data descriptive of the uses for subsequent processing, and provide the sensor and usage data in response to queries for the same received via the network interface 128. When executing according to its configuration, the profile storage device 110 implements a variety of components described below with reference to FIG. 2. In some embodiments, these components, in turn, store information in data structures in accordance with the data model described further below with reference to in FIG. 3. These components also execute one or more user profiling processes described further below with reference to FIG. 4.

In some embodiments, the data collection service 112 is configured to transmit information descriptive of associations between users (e.g., the user 140) and IoT products (e.g., the IoT products 102, 104, and 106) to the profile storage device 110. In some embodiments, the profile storage device 110 is configured to use these associations to associate sensor data and usage information with users. In other embodiments, associations between users and IoT products may be derived from other sources, such as the IoT product interface device 108 or the sensors 134, 136, and 138 themselves. Both of these and other embodiments are described further below with reference to FIGS. 2-4.

In another embodiment illustrated by FIG. 1, the marketer interface device 114 is configured to provide a user interface that processes queries for usage information. When executing according to this configuration, the marketer interface device 114 provides the user 142 with the user interface and communicates queries and query results with the profile storage device 110 via the network interface 132, the network 116, and the network interface 128. Additional details regarding this user interface are described below with reference to FIG. 2.

Although FIG. 1 illustrates three IoT products, one IoT product interface device, one profile storage device, one data collection service, and one marketer interface device, the embodiments disclosed herein are not limited to a particular number of any given device. Other embodiments may include more or fewer numbers of each type of device or may include other types of devices without departing from the scope of the embodiments disclosed herein.

Figure 2:
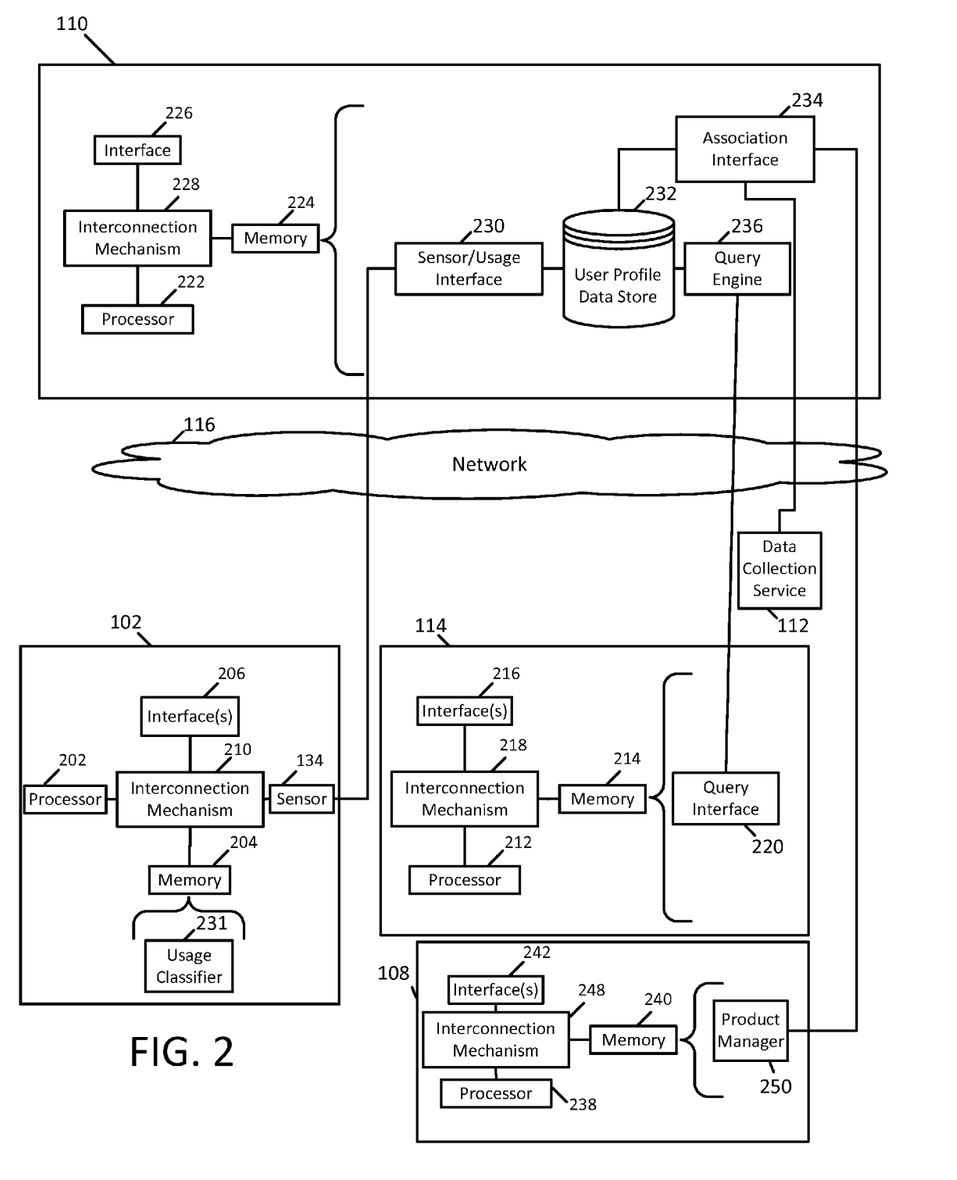
FIG. 2 is a block diagram illustrating an example profile storage device, an example marketer interface device, and an example Internet of Things (IoT) product, each configured in accordance with one or more embodiments of the present disclosure.

FIG. 2 shows a more detailed view of the IoT product 102, the marketer interface device 114, the IoT product interface device 108, and the profile storage device 110. As shown in FIG. 2, the IoT product 102 includes a processor 202, a memory 204, an interconnection mechanism 210, an interface(s) 206, a usage classifier 231, and the sensor 134. The marketer interface device 114 includes a processor 212, a memory 214, an interconnection mechanism 218, an interface(s) 216 and a query interface 220. The IoT product interface device 108 includes a processor 238, a memory 240, an interconnection mechanism 248, an interface(s) 242, and a product manager 250. The profile storage device includes a processor 222, a memory 224, an interconnection mechanism 228, an interface(s) 226, a sensor/usage interface 230, an association interface 234, a query engine 236, and a user profile data store 232.

As illustrated in FIG. 2, the IoT product 102, the marketer interface device 114, the IoT product interface device 108, and the profile storage device 110 each include a suite of components that are standard for a programmable device. These components are the processors 202, 212, 222, and 238, the memories 204, 214, 224, 240, the interconnection mechanisms 210, 218, 228, and 248, and the interfaces 206, 216, 226, 242. Although the particular types and models of the standard components may vary between any two of the programmable devices described herein, it is appreciated that each programmable device includes a processor, memory, interconnection mechanism, and an interface as described below with reference to the profile storage device 110.

The interface(s) 226 includes one or more physical interface devices such as input devices, output devices, and combination input/output devices and a software stack configured to drive operation of the devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems. The interface(s) 226 include the network interface 128. Similarly, the interfaces 206 and 216 each respectively include the network interfaces 118 and 132. The interface(s) 242 include the network interfaces 124 and 126.

The interconnection mechanism 228 is a communication coupling between the processor 222, the memory 224, and the interface 226. The interconnection mechanism 228 may include one or more physical busses in conformance with specialized or standard computing bus technologies such as IDE, SCSI, PCI, and InfiniBand. The interconnection mechanism 228 enables communications, including instructions and data, to be communicated between the processor 222, the memory 224, and the interface 226.

The memory 224 includes readable and/or writeable data storage that stores programs and data used or manipulated during operation of a programmable device. The programs stored in the memory 218 are a series of instructions that are executable by the processor 222. The memory 224 may include relatively high performance data storage, such as registers, caches, dynamic random access memory, and static memory. The memory 224 may further include a relatively low performance, non-volatile data storage medium such as flash memory or an optical or magnetic disk. Various embodiments may organize the memory 224 into particularized and, in some cases, unique structures to store data in support of the components disclosed herein. These data structures may be specifically configured to conserve storage space or increase data exchange performance and may be sized and organized to store values for particular data and types of data.

To implement specialized components of some embodiments, the processor 222 executes a series of instructions (i.e., one or more programs) that result in manipulated data. The processor 222 may be any type of processor, multiprocessor, microprocessor, or controller known in the art. The processor 222 is connected to and communicates data with the memory 224 and the interface 226 via the interconnection mechanism 228. In operation, the processor 222 causes data to be read from a non-volatile (i.e., non-transitory) data storage medium in the memory 224 and written to high performance data storage. The processor 222 manipulates the data within the high performance data storage, and copies the manipulated data to the data storage medium after processing is completed.

Although the IoT product 102, the marketer interface device 114, the IoT product interface device 108, and the profile storage device 110 are shown by way of example as types of programmable device capable of executing the processes disclosed herein, embodiments are not limited to being implemented on the programmable devices shown in FIG. 2. Various processes may be practiced on one or more programmable devices having a different architectures or components than those shown in FIG. 2. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a programmable device as disclosed herein may be implemented in software, hardware, firmware, or any combination thereof.

In addition to the standard suite of components described above, the IoT product 102, the marketer interface device 114, the IoT product interface device 108, and the profile storage device 110 include several customized components. For example, the IoT product 102 includes the sensor 134 and the usage classifier 231. The marketer interface device 114 includes the query interface 220. The IoT product interface device 108 includes the product manager 250. The profile storage device 110 includes the sensor/usage interface 230, the association interface 234, the query engine 236, and the user profile data store 232.

In at least one embodiment, at least some of the customized components in FIG. 2 are implemented by the processor of the device including the component. As described above, this processor may be general purpose processor. However, when executing a specific software process as provided herein (e.g., FIG. 4) or constructing specific data structures as provided herein (e.g., FIG. 3), the processor becomes a special purpose processor capable of making specific logic-based determinations based on input data received, and further capable of providing one or more outputs that can be used to control or otherwise inform subsequent processing to be carried out by the processor and/or other processors or circuitry with which processor is communicatively coupled. The processor reacts to specific input stimulus in a specific way and generates a corresponding output based on that input stimulus. In this sense, the structure of processor according to one embodiment is defined by the flow chart shown in FIG. 4 and this structure implements the data model illustrated in FIG. 3. Moreover, in some example cases, the processor proceeds through a sequence of logical transitions in which various internal register states and/or other bit cell states internal or external to the processor may be set to logic high or logic low. This specific sequence of logic transitions is determined by the state of electrical input signals to the processor and a special-purpose structure is effectively assumed by the processor when executing each software instruction of the software process shown in FIG. 4. Specifically, those instructions anticipate the various stimulus to be received and change the implicated memory states accordingly. In this way, the processor may generate and store or otherwise provide useful output signals. Thus, it is appreciated that the processor, during execution of a software process becomes a special purpose machine, capable of processing only specific input signals and rendering specific output signals based on the one or more logic operations performed during execution of each software instruction. In at least some examples, the processor is configured to execute a function where software is stored in a data store in communication with to the processor and that software is configured to cause the processor to proceed through a sequence of various logic decisions that result in the function being executed.

In some embodiments, the usage classifier 231 of the IoT product 102 is configured to identify instances of product usage within sensor data acquired by the sensor 134, generate usage data descriptive of these instances of IoT product usage, and store and/or transmit the usage data to an external device (e.g., the IoT product interface device 108 and/or the profile storage device 110). When executing according to its configuration, the usage classifier 231 may implement a variety of artificial intelligence techniques. For example, in one embodiment, the usage classifier 231 is configure to implement an artificial neural network trained using values of physical parameters known to represent instances of particular IoT product usages. In this embodiment, the usage classifier 231 is configured to provide newly acquired sensor data to the artificial neural network and to receive a usage classification as output. In this embodiment, the usage classifier 231 is further configured to store and/or transmit usage data that associates the newly acquired sensor data with the usage classification where the output usage classification is associated with a degree of confidence that exceeds a threshold value. For example, the usage classifier may transmit usage data that includes an identifier of the usage classification in association with one or more identifiers of measurements included in sensor data. This usage data may be transmitted to, for example, the sensor/usage interface 230 (e.g., via the interface(s) 206). As described below, the sensor/usage interface 230 may store this association as usage data in the user profile data store 232.

In another embodiment, the usage classifier 231 is configured to implement an inference engine built to infer usage data from newly acquired sensor data. In this embodiment, the inference engine is configured to evaluate the newly acquired sensor data and, where the sensor data satisfies the logical implications included in the inference engine, store and/or transmit usage data that associates an identifier of the usage and identifiers of measurements in the sensor data. The logical implications evaluated may, for example, compare measurement values in the sensor data to predefined thresholds and ranges to identify and extract usage instances from the sensor data. This usage data may be transmitted to, for example, the sensor/usage interface 230 (e.g., via the interface(s) 206). As described below, the sensor/usage interface 230 may store this association as usage data in the user profile data store 232.

In some embodiments, the sensor 134 of the IoT product 102 is configured to transmit sensor data to the sensor/usage interface 230 of the profile storage device 110 via the interface(s) 206 and the network 116. This sensor data may include one or more identifiers of the sensor 134 (e.g., a serial number, a dynamic or static internet protocol address, etc.), one or more identifiers of measurements acquired by the sensor 134, and one or more values of physical parameters measured by the sensor 134. Additionally or alternatively, the sensor data may include an identifier of the IoT product 102. In some embodiments, as described above, the sensor 134 is also configured to provide sensor data to the usage classifier 231 for usage classification processing. Such provision may be via communication of the sensor data to the usage classifier 231 and/or via storage of the sensor data in the memory 204.

In some embodiments, the query interface 220 of the marketer interface device 114 is configured to implement a user interface through which a user (e.g., the user 142) may analyze user profiles. When executing according to this configuration, the query interface 220 includes elements configured to receive input specifying a query. The query may specify one or more search criterion to be met by any search results returned to the query interface 220. In response to receiving the input, the query interface 220 communicates the query to the query engine 236 of the profile storage device 110 via the interface(s) 216 and the network 116. In response to receiving search results from the query engine 236, the user interface provides the search results to the user.

In some embodiments, the product manager 250 of the IoT product interface device 108 is configured to manage one or more IoT products (e.g., the IoT product 106). When executing according to its configuration, the product manager 250 may manage, act as a proxy for, and/or act as data passthrough for the IoT product.

When acting as a manager of the IoT product, the IoT product interface device 108 may, for example, implement a user interface to enable a user (e.g., the user 140) to configure the IoT product and/or its components. Further, the user interface may access and provide sensor data to the user and communicate sensor data and/or register information for the IoT product via the interface(s) 216. Additionally, when acting as a manager of the IoT product, the IoT product interface device 108 may transmit information specifying an association between the IoT product and the user to the profile storage device 110, and/or transmit information specifying an association between the IoT product and the sensor housed in the IoT product to the profile storage device 110. When acting as a proxy for the IoT product, the IoT product interface device 108 may, for example, communicate with other components of the profile storage system 100 on behalf of the IoT product. When connected to, and acting as a passthrough for, the IoT product, the IoT product interface device 108 may, for example, receive sensor data from the interface(s) 216 and transmit the sensor data to the profile storage device 110 via the interface(s) 216 and the network 116.

Turning now to the profile storage device 110, in some embodiments the sensor/usage interface 230 is configured to process sensor data and/or usage data originating from various sensors and network interfaces housed within IoT products, such as the IoT product 102. This sensor data may include identifiers of sensors, products, physical parameters being measure and measurement values. The usage data may include identifiers of IoT product usages and identifiers of measurements associated with identified instances of usage. When executing according to its configuration, the sensor/usage interface 230 executes several acts described further below with reference to FIG. 4.

In some embodiments, the association interface 234 is configured to process data specifying associations between IoT products and sensors and associations between IoT products and users. For instance, in one embodiment, the association interface 234 is configured to receive association information from a product manager (e.g., the product manager 250) that identifies an association between a user (e.g., the user 140) and an IoT product (e.g., the IoT product 106) and that identifies an association between the IoT product and one or more sensors (e.g., the sensor 138). For example, this association information may be generated as part of a user registration process executed by the product manager 250. In other embodiments, the association interface 234 is also configured to receive information identifying these associations from a data collection service (e.g., the data collection service 112). In still other embodiments, this association information may be present in the sensor data received by the sensor interface. In this case, the association interface 234 identifies the association information by interrogating the user profile data store 232. Regardless of the source of the association information, the association interface 234 is configured to parse the information and store associations between IoT products and user and between IoT products and sensors in the user profile data store 232.

In some embodiments, the query engine 236 is configured to receive queries from the query interface 220, execute the queries by searching the user profile data store 232 to identify information satisfying the query, and return search results including the identified information to the query interface 220. This identified information may include sensor data, usage information, association information, and the like. The query engine 236 may be implemented using a variety of search engine technologies and the embodiments disclosed herein are not limited to a particular search technique.

Although an embodiment implementing particular functionality is discussed herein with reference to particular components, it should be noted that, in other embodiments, the functionality of individual components can be separated into multiple components, and/or at least some functionality of multiple components can be combined into a single component. For example, in some embodiments, the usage classifier 231 is omitted from the IoT product sensor 102 and, instead, is implemented by the IoT product interface device 108 or the profile storage device 110. These embodiments may be advantageous where, for example, the IoT product 102 has restricted processing and/or power capacity. Thus the embodiments disclosed herein are not limited to the architecture illustrated in FIGS. 1 and 2.

Information may flow between the any of the components described herein using a variety of techniques. Such techniques include, for example, passing the information over a network using standard protocols, such as TCP/IP or HTTP or HTTPS, and passing the information between components via data structures written in shared volatile or non-volatile memory. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Figure 3:
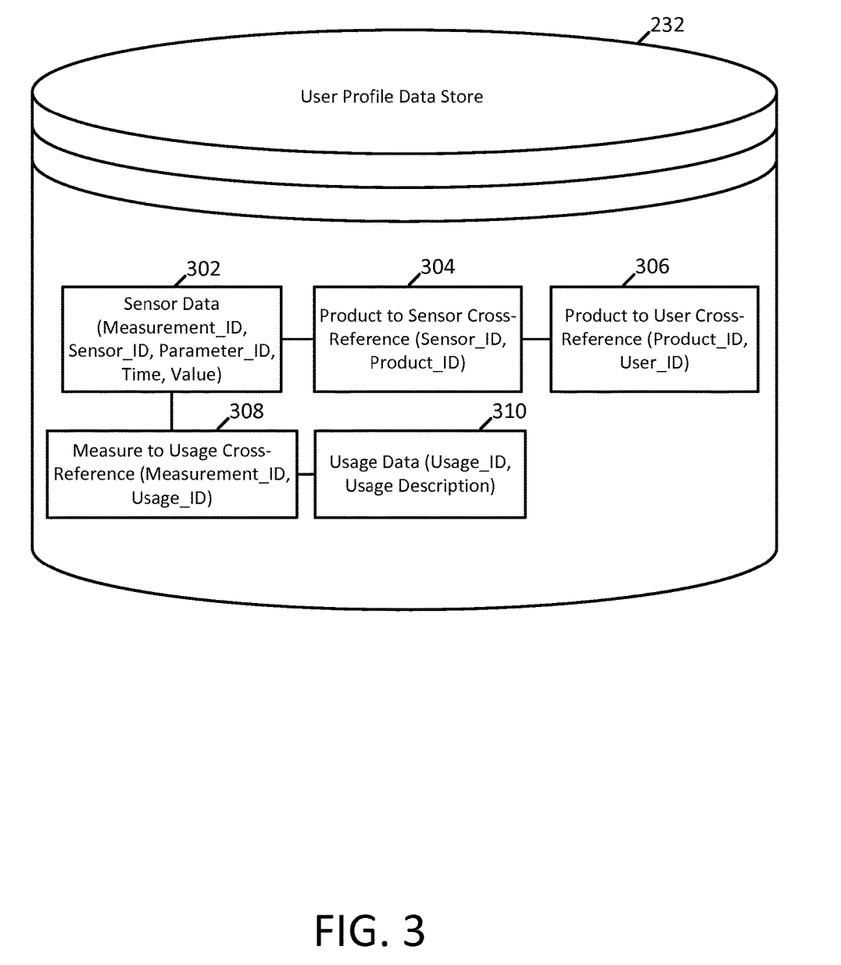
FIG. 3 is an illustration of an example relational model for a user profile data store configured in accordance with one or more embodiments of the present disclosure.

FIG. 3 illustrates a data model implemented within the user profile data store 232 according to one embodiment. As illustrated in FIG. 3, the user profile data store 232 includes 5 tables 302, 304, 306, 308, and 310. The table 302 stores sensor data that includes fields specifying measurement identifiers, sensor identifiers, parameter identifiers, measurement times, and values of physical parameter measurements. The table 304 stores association information in a cross-reference that associates sensor identifiers with product identifiers. The table 304 includes fields specifying sensor identifiers and product identifiers that are associated with one another. The table 306 stores association information in a cross-reference that associates product identifiers with user identifiers. The table 306 includes fields specifying product identifiers and sensor identifiers that are associated with one another. The table 308 stores association information in a cross-reference that associates measurement identifiers with usage identifiers. The table 308 includes fields specifying measurement identifiers and usage identifiers that are associated with one another. The table 310 stores usage data that includes data fields specifying usage identifiers and descriptions of usages. In some embodiments, an association interface (e.g., the association interface 234) populates the tables 304 and 306. In these embodiments, the query engine 236 may refer to the cross-references to when executing queries, depending on the search criteria specified in the query.

Figure 4:
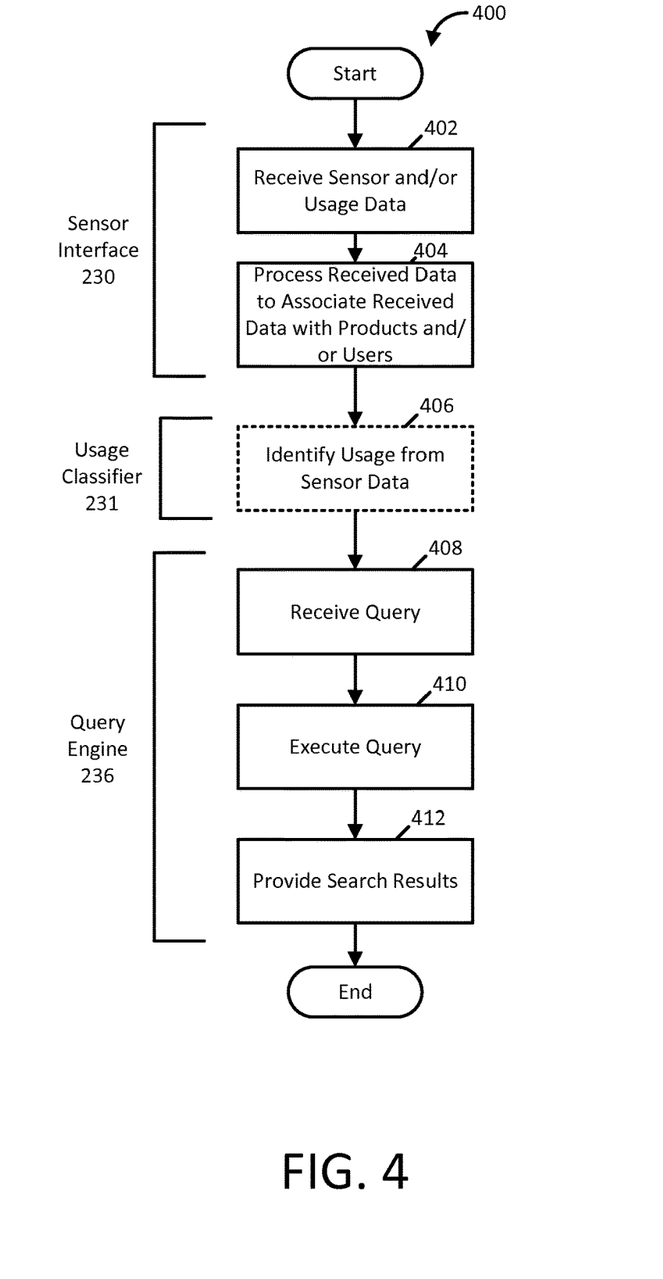
FIG. 4 is a flowchart illustrating an example user profile generation and querying process configured in accordance with one or more embodiments of the present disclosure.

As described above, some embodiments execute user profile generation and querying processes using one or more programmable devices, such as the programmable devices described above with reference to FIGS. 1 and 2. FIG. 4 illustrates one example of such a process, the profiling process 400, which is executed by a profile storage device (e.g., the profile storage device 110).

The profiling process 400 starts in act 402 where a sensor/usage interface (e.g., the sensor/usage interface 230) receives sensor data and/or usage data. In act 404, the sensor/usage interface processes the data received in the act 402. This processing may include parsing the data, verifying the data originated from a trusted source (e.g., the sensor data includes a sensor_ID recorded in the user profile data store 232 as a trusted sensor and/or the usage data includes a usage_ID recorded in the user profile data store 232 as a predefined usage), verifying that the data is well-formed, storing the data in the user profile data sore 232 (e.g., in the tables 302 and 308), and acknowledging receipt of the sensor data and/or usage data (e.g., where the communication protocol used to communicate the sensor data is bidirectional).

In act 406 a usage classifier (e.g., the usage classifier 231) identifies usages described by the sensor data and stores usage data that describes the identified usages in the user profile data store. For example, as described above, the usage classifier may execute an inference engine or artificial neural network, among other artificial intelligence components, using the sensor data processed in the act 404 to generate usage data that identifies usages indicated within the sensor data. In some embodiments, the act 406 is optional, as indicated by the use of dashed lines in FIG. 4, and is only executed where sensor data is received without corresponding usage data.

In act 408, a query engine (e.g., the query engine 236) receives query from a query interface (e.g., the query interface 220). In act 410, the query engine executes the query to generate search results. In executing the query, the query engine may access the user profile data store. For example, where the predicate of the query references a particular user, the query engine may access the table 306 to identify products associated with the user, may access the table 304 to identify sensors associated with the identified products, and may access the table 308 to identify usages associated with identified sensors to generate search results that provide sensor data and usage data associated with the particular user. This type of query may be referred to herein as a "user profile." In act 412, the query engine provides the search results to the query interface and the profiling process 400 ends.

Processes in accord with the profiling process 400 enable profile storage devices to generate user profiles from sensor data and execute queries against the user profiles to provide insight into how users interact with IoT products.

The process 400 depicts one particular sequence of acts in a particular example. The acts included in these processes may be performed by, or using, one or more programmable devices specially configured as discussed herein. Some acts are optional and, as such, may be omitted in accord with one or more examples. Additionally, the order of acts can be altered, or other acts can be added, without departing from the scope of the embodiments discussed herein. For example, in some embodiments, the process 400 consists of at least two distinct processes. In these embodiments, the first process begins with the act 402 and ends with the act 406 and the second process begins with the act 408 and ends with the act 412. Furthermore, as discussed above, in at least one example, the acts are performed on a particular, specially configured machine, namely a profile storage system configured according to the examples and embodiments disclosed herein.

To further illustrate the operation of the profile storage system described above, a few examples including particular IoT products will now be described. In a first example, the IoT product is a snowboard. In this example, the sensors housed in the snowboard include a thermometer, an accelerometer, and contact sensors. These sensors, in combination, can measure environmental parameters and interactions between the snowboard and a user. In this example, the thermometer measures ambient temperature, the accelerometer measures movement of the snowboard and audio generated by the snowboard's movement across the snow and ice, and the contact sensors measure connections (or lack thereof) between the user's boot and bindings. From these measurements, environmental parameters such as temperature and snow conditions (e.g., packed snow, icy snow, and the like) can be detected or inferred. Also, from these measurements, a usage classifier can identify usage instances of the snowboard by the user such as "user strapped into bindings," "user jumped," and "user landed." These usage instances can be transmitted and stored as usage data for subsequent querying by marketing personnel.

In at least one embodiment, the usage data is encoded as in a human readable format. One example of this type of encoding of usage data follows.

```
{
    id: "Burton GT-2000x",
    productCategory: "snowboard",
    environment: {
        condition: "icy snow",
        temperature: "14 F"
    },
    usage: "user strapped into bindings"
}
```

In another example the IoT product is a pair of shoes. In this example, the sensors housed in the shoes include a location sensor (e.g., an iBeacon and/or a global positioning system chipset) that can measure changes in the location of the shoes, determine absolute locations of the shoes, and/or detect whether the shoes are within a geofence. From these location measurements, environmental parameters such as ambient temperature can be estimated with reference to Internet-based weather services. Also, from these location measurements, the usage classifier can identify usage instances such as "user stepped," "user visited restaurant X," or the like. These usage instances can be transmitted and stored as usage data for subsequent querying by marketing personnel.

In another example, the IoT product 106 is a pair of sunglasses. In this example, the sensors include contact sensors that can detect whether hinges that connect the temples to the endpieces are open or closed. From these measurements, the usage classifier can identify usage instances of the sunglasses by the user, such as "user put on sunglasses." These usage instances can be transmitted and stored as usage data for subsequent querying by marketing personnel.

In another example, the user 142 enters a variety of queries to analyze the usage data described above. In this example these queries include "GET all products interacted with in the last month," "GET all wearable products," and "GET all snowboarding usage." In response to receiving these queries, the query interface 220 of the marketer interface device 144 transmits data representative of the queries to the query engine 236 via the interface(s) 216, the network 116, and the interface(s) 226. In response to receiving the queries, the query engine 236 generates search results by identifying usage and product data in the user profile data store 232 that satisfies the queries and transmits information descriptive of the search results to the query interface 220. In response to receiving the information descriptive of the search results, the query interface 220 presents the search results to the user 142.

Further Example Embodiments

In one embodiment, a system comprising a profile storage device is provided. The profile storage device includes a memory and at least one processor coupled to the memory. The at least one processor is configured to receive first usage data descriptive of a first use of a first physical Internet of Things (IoT) product, receive second usage data descriptive of a second use of a second physical IoT product, and associate the first usage data and the second usage data with a user of the first physical IoT product and the second physical IoT product.

In the system, the at least one processor may be further configured to receive a query requesting usage data that satisfies at least one search criterion and respond to the query by providing usage data that satisfies the at least one search criterion. In the system, the memory may store a first association between the first physical IoT product and a first product type and a second association between the second physical IoT product and a second product type, the second product type being different from the first product type. The first usage data may include a first value of a first physical parameter measuring the first use. The first physical parameter may be an environmental parameter.

The system may further comprise the first physical IoT product; and a sensor included in the first physical IoT product and configured to measure the first value during the first use. In the system, the profile storage device may include a first network interface coupled to the at least one processor and the first physical IoT product may include a second network interface coupled to the sensor and configured to transmit the first value to the profile storage device via the first network interface.

The system may further comprise a programmable device distinct from the profile storage device and the first physical IoT product. The profile storage device may include a first network interface coupled to the at least one processor. The first physical IoT product may include a second network interface. The programmable device may include a third network interface configured to connect to the second network interface to receive the first value from the first physical IoT product and a fourth network interface configured to transmit the first value to the profile storage device via the first network interface.

In the system, the first value may be included in first sensor data comprising a first sensor identifier. A second value of a second physical parameter measuring the second use may be included in second sensor data comprising a second sensor identifier. The at least one processor may be configured to receive the first usage data at least in part by receiving the first sensor data; receive the second usage data at least in part by receiving the second sensor data; and associate the first usage data and the second usage data with the user at least in part by identifying a first association between the first sensor identifier and an identifier of the first physical IoT product and a second association between the second sensor identifier and an identifier of the second physical IoT product.

In the system, the at least one processor may be configured to associate the first usage data and the second usage data with the user at least in part by identifying a third association and a fourth association. The third association may be between an identifier of the user and at least of the first sensor identifier and the identifier of the first physical IoT product. The fourth association may be between the identifier of the user and at least one of the second sensor identifier and the identifier of the second physical IoT product. The profile storage device may include a network interface coupled to the at least one processor and the at least one processor may be further configured to receive association information defining the third association and the fourth association from one or more remote programmable devices via the network interface. The one or more remote programmable devices may implement a user registration component. The one or more remote programmable devices may implement a data collecting service.

In another embodiment, a method implemented by a system comprising a profile storage device is provided. The profile storage device includes at least one processor. The method includes acts of receiving first usage data descriptive of a first use of a first physical Internet of Things (IoT) product; receiving second usage data descriptive of a second use of a second physical IoT product; and associating the first usage data and the second usage data with a user of the first physical IoT product and the second physical IoT product.

The method may further include acts of receiving a query requesting usage data that satisfies at least one search criterion and responding to the query by providing usage data that satisfies the at least one search criterion. The method may further include an act of measuring a value of a physical parameter descriptive of the first use with a sensor included in the first physical IoT product. The method may further include an act of transmitting the value to the profile storage device via a network interface included in the first physical IoT product and coupled to the sensor. The method may further include an act of measuring, during the first use, at least one environmental parameter with a sensor included in the first physical IoT product.

In another embodiment, a non-transitory computer readable medium is provided. The computer readable medium stores computer executable instructions configured to instruct at least one processor to execute a method of building user profiles. The method includes acts of receiving first usage data descriptive of a first use of a first physical Internet of Things (IoT) product; receiving second usage data descriptive of a second use of a second physical IoT product; and associating the first usage data and the second usage data with a user of the first physical IoT product and the second physical IoT product.

In the computer readable medium, the instructions may be further configured to instruct the at least one processor to execute acts including receiving a query requesting usage data that satisfies at least one search criterion and responding to the query by providing usage data that satisfies the at least one search criterion.

Having thus described several aspects of at least one embodiment, it is to be appreciated that various alterations, modifications, and improvements will readily occur to those skilled in the art. For instance, embodiments disclosed herein may also be used in other contexts. Such alterations, modifications, and improvements are intended to be part of this disclosure, and are intended to be within the scope of the embodiments discussed herein. Accordingly, the foregoing description and drawings are by way of example only.

What is claimed is:

1. A system comprising a profile storage device including:
a memory;
a first network interface; and
at least one processor coupled to the memory and the first network interface and configured to:
receive, via the first network interface, first sensor data including a first sensor identifier and at least one first value of a first physical parameter measuring a first use of a first physical Internet of Things (IoT) product;
receive, via the first network interface, second sensor data including a second sensor identifier and at least one second value of a second physical parameter measuring a second use of a second physical Internet of Things (IoT) product;
receive, via the first network interface from at least one remote programmable device distinct from the first physical IoT product and the second physical IoT product, association information defining a first association between an identifier of a user and an identifier of the first physical IoT product;
receive, via the first network interface from the at least one remote programmable device, association information defining a second association between the identifier of the user and an identifier of the second physical IoT product;
classify the first sensor data to generate first usage data descriptive of the first use;
classify the second sensor data to generate second usage data descriptive of the second use; and
associate, within an enhanced user profile describing on-line and off-line device usage, the first usage data and the second usage data with the user of the first physical IoT product and the second physical IoT product at least in part by identifying the first association, the second association, a third association between the first sensor identifier and an identifier of the first physical IoT product, and a fourth association between the second sensor identifier and an identifier of the second physical IoT product.

2. The system of claim 1, wherein the at least one processor is further configured to:
receive a query requesting usage data that satisfies at least one search criterion; and
respond to the query by providing usage data that satisfies the at least one search criterion.

3. The system of claim 1, wherein the memory stores:
a fifth association between the first physical IoT product and a first product type; and
a sixth association between the second physical IoT product and a second product type, the second product type being different from the first product type.

4. The system of claim 1, wherein the first physical parameter is an environmental parameter.

5. The system of claim 1, further comprising:
the first physical IoT product; and
a sensor included in the first physical IoT product and configured to measure the first value during the first use.

6. The system of claim 5, wherein the first physical IoT product includes a second network interface coupled to the sensor and configured to transmit the first value to the profile storage device via the first network interface.

7. The system of claim 5, further comprising a programmable device distinct from the profile storage device and the first physical IoT product, wherein the first physical IoT product includes a second network interface, and the programmable device includes:
a third network interface configured to connect to the second network interface to receive the first value from the first physical IoT product; and a fourth network interface configured to transmit the first value to the profile storage device via the first network interface.

8. The system of claim 1, wherein the one or more remote programmable devices implement a user registration component.

9. The system of claim 1, wherein the one or more remote programmable devices implement a data collecting service.

10. A method implemented by a system comprising a profile storage device including at least one processor, the method comprising:
receiving first sensor data including a first sensor identifier and at least one first value of a first physical parameter measuring a first use of a first physical Internet of Things (IoT) product;
receiving second sensor data including a second sensor identifier and at least one second value of a second physical parameter measuring a second use of a second physical Internet of Things (IoT) product;
receiving, from at least one remote programmable device, association information defining a first association between an identifier of a user and an identifier of the first physical IoT product;
receiving, from the at least one remote programmable device distinct from the first physical IoT product and the second physical IoT product, association information defining a second association between the identifier of the user and an identifier of the second physical IoT product;
classifying the first sensor data to generate first usage data descriptive of the first use;
classifying the second sensor data to generate second usage data descriptive of the second use; and
associating, within an enhanced user profile describing on-line and off-line device usage, the first usage data and the second usage data with a user of the first physical IoT product and the second physical IoT product at least in part by identifying the first association, the second association, a third association between the first sensor identifier and an identifier of the first physical IoT product, and a fourth association between the second sensor identifier and an identifier of the second physical IoT product.

11. The method of claim 10, further comprising:
receiving a query requesting usage data that satisfies at least one search criterion; and
responding to the query by providing usage data that satisfies the at least one search criterion.

12. The method of claim 10, further comprising measuring the at least one first value with a sensor identified by the first sensor identifier and included in the first physical IoT product.

13. The method of claim 12, further comprising transmitting the first sensor identifier and the at least one first value to the profile storage device via a network interface included in the first physical IoT product and coupled to the sensor.

14. The method of claim 10, further comprising measuring, during the first use, at least one environmental parameter with a sensor identified by the first sensor identifier and included in the first physical IoT product.

15. A non-transitory computer readable medium storing computer executable instructions configured to instruct at least one processor to execute a method of building user profiles, the method comprising:
receiving first sensor data including a first sensor identifier and at least one first value of a first physical parameter measuring a first use of a first physical Internet of Things (IoT) product;
receiving second sensor data including a second sensor identifier and at least one second value of a second physical parameter measuring a second use of a second physical Internet of Things (IoT) product;
receiving, from at least one remote programmable device, association information defining a first association between an identifier of a user and an identifier of the first physical IoT product;
receiving, from the at least one remote programmable device distinct from the first physical IoT product and the second physical IoT product, association information defining a second association between the identifier of the user and an identifier of the second physical IoT product;
classifying the first sensor data to generate first usage data descriptive of the first use;
classifying the second sensor data to generate second usage data descriptive of the second use; and
associating, within an enhanced user profile describing on-line and off-line device usage, the first usage data and the second usage data with a user of the first physical IoT product, the second physical IoT product, a third association between the first sensor identifier and an identifier of the first physical IoT product, and a fourth association between the second sensor identifier and an identifier of the second physical IoT product.

16. The computer readable medium of claim 15, the method further comprising:
receiving a query requesting usage data that satisfies at least one search criterion; and
responding to the query by providing usage data that satisfies the at least one search criterion.

* * * * *